(12) United States Patent
Burns et al.

(10) Patent No.: US 10,419,295 B1
(45) Date of Patent: Sep. 17, 2019

(54) SYSTEM, METHOD, AND COMPUTER PROGRAM FOR AUTOMATICALLY GENERATING COMMUNICATION DEVICE METADATA DEFINITIONS

(71) Applicant: Amdocs Software Systems Limited, Dublin (IE)

(72) Inventors: Colin Paul Burns, Bath (GB); Michael Christian Rehder, Brighton (CA)

(73) Assignees: AMDOCS DEVELOPMENT LIMITED, Limassol (CY); AMDOCS SOFTWARE SYSTEMS LIMITED, Dublin (IE)

( * ) Notice: Subject to any disclaimer, the term of this patent is extended or adjusted under 35 U.S.C. 154(b) by 422 days.

(21) Appl. No.: 14/506,555

(22) Filed: Oct. 3, 2014

(51) Int. Cl.
  *H04L 12/24* (2006.01)

(52) U.S. Cl.
  CPC .......... *H04L 41/145* (2013.01); *H04L 41/08* (2013.01); *H04L 41/0876* (2013.01); *H04L 41/16* (2013.01)

(58) Field of Classification Search
  CPC ... H04L 41/145; H04L 41/08; H04L 41/0876; H04L 41/16
  See application file for complete search history.

(56) References Cited

U.S. PATENT DOCUMENTS

| | | | | |
|---|---|---|---|---|
| 7,016,980 B1 * | 3/2006 | Mayer | ............... | H04L 41/0853 709/248 |
| 7,020,881 B2 * | 3/2006 | Takahashi | ............. | G06F 3/0481 348/E5.102 |
| 7,174,372 B1 * | 2/2007 | Sarkar | ................... | H04L 41/082 707/999.102 |
| 7,188,114 B2 * | 3/2007 | Liu | ..................... | G06F 17/3089 |
| 7,251,777 B1 * | 7/2007 | Valtchev | ............. | G06F 17/211 707/999.006 |
| 7,305,671 B2 * | 12/2007 | Davidov | .................. | G06F 8/30 717/108 |
| 7,350,191 B1 * | 3/2008 | Kompella | ................ | G06F 8/61 707/999.005 |
| 7,437,434 B2 * | 10/2008 | Zintel | ................ | H04L 12/2803 709/220 |
| 7,487,230 B2 * | 2/2009 | Gu | ...................... | H04L 12/2805 709/220 |
| 7,581,170 B2 * | 8/2009 | Baumgartner | .... | G06F 17/30867 715/234 |
| 7,610,559 B1 * | 10/2009 | Humpleman | ....... | H04L 12/2803 715/733 |
| 7,734,590 B2 * | 6/2010 | Chand | ...................... | G06F 8/10 707/636 |
| 7,886,225 B2 * | 2/2011 | Cope | .................. | G06F 17/2247 715/231 |

(Continued)

*Primary Examiner* — Patrice L Winder
*Assistant Examiner* — Angela M Widhalm De Rodrig
(74) *Attorney, Agent, or Firm* — Zilka-Kotab, P.C.

(57) ABSTRACT

A system, method, and computer program product are provided for automatically generating communication device metadata definitions. In use, device information is received from at least one instance of at least one communication device associated with a communication network. Additionally, a device metadata definition associated with the at least one communication device is automatically generated utilizing the device information, the device metadata definition representing at least attributes of the at least one communication device.

11 Claims, 4 Drawing Sheets

(56) References Cited

U.S. PATENT DOCUMENTS

| | | | | |
|---|---|---|---|---|
| 7,937,486 B2* | 5/2011 | Ohsumi | G06F 17/30867 | 709/230 |
| 8,296,801 B2* | 10/2012 | Takagi | G11B 27/031 | 348/143 |
| 8,347,243 B2* | 1/2013 | Bruneel | G06F 17/5054 | 716/103 |
| 8,543,527 B2* | 9/2013 | Bates | G06Q 10/10 | 706/45 |
| 8,799,756 B2* | 8/2014 | Grosz | G06F 3/1242 | 382/118 |
| 8,886,591 B2* | 11/2014 | McDonald | G06F 17/30563 | 705/4 |
| 8,893,086 B2* | 11/2014 | Bassin | G06Q 10/06 | 717/124 |
| 8,930,496 B2* | 1/2015 | Gokhale | G06F 11/1435 | 709/203 |
| 8,976,708 B1* | 3/2015 | Cohn | H04L 41/145 | 370/254 |
| 9,292,625 B2* | 3/2016 | Tyagi | G06F 17/30994 | |
| 9,454,647 B1* | 9/2016 | Richards | G06F 21/10 | |
| 2003/0105778 A1* | 6/2003 | Andani | H04L 12/2805 | |
| 2003/0204481 A1* | 10/2003 | Lau | G06F 8/34 | |
| 2005/0144594 A1* | 6/2005 | Yamazaki | H04L 41/0226 | 717/136 |
| 2005/0278375 A1* | 12/2005 | Mitchko | G06F 17/30817 | |
| 2006/0064283 A1* | 3/2006 | Saidi | H04L 41/16 | 702/183 |
| 2009/0089027 A1* | 4/2009 | Sturrock | G05B 17/02 | 703/6 |
| 2009/0178019 A1* | 7/2009 | Bahrs | G06F 21/62 | 717/104 |
| 2009/0271760 A1* | 10/2009 | Ellinger | G06F 8/20 | 717/101 |
| 2012/0198052 A1* | 8/2012 | Ljung | H04L 41/0859 | 709/224 |
| 2012/0303144 A1* | 11/2012 | Grossmann | G05B 19/0426 | 700/90 |
| 2012/0310868 A1* | 12/2012 | Martins | G06F 17/30616 | 706/12 |
| 2013/0179545 A1* | 7/2013 | Bishop | H04L 67/42 | 709/219 |
| 2013/0204847 A1* | 8/2013 | Murayama | H02J 3/00 | 707/691 |
| 2013/0329599 A1* | 12/2013 | Barkan | H04L 45/02 | 370/254 |
| 2014/0095670 A1* | 4/2014 | Ozgur | H04W 4/70 | 709/219 |
| 2014/0129457 A1* | 5/2014 | Peeler | G06Q 30/018 | 705/317 |
| 2014/0371882 A1* | 12/2014 | Nikhra | G05B 13/02 | 700/89 |
| 2015/0193697 A1* | 7/2015 | Vasseur | H04L 43/0876 | 706/12 |
| 2015/0269383 A1* | 9/2015 | Lang | G06F 21/57 | 726/1 |
| 2015/0288569 A1* | 10/2015 | Agarwal | H04L 41/12 | 709/224 |
| 2015/0317421 A1* | 11/2015 | Auerbach | G06F 17/5022 | 716/106 |
| 2016/0156955 A1* | 6/2016 | Israel | G06F 17/30038 | 725/34 |

* cited by examiner

SYSTEM, METHOD, AND COMPUTER PROGRAM FOR AUTOMATICALLY GENERATING COMMUNICATION DEVICE METADATA DEFINITIONS

FIELD OF THE INVENTION

The present invention relates to communication networks and more particularly to defining models of communication equipment associated with such networks.

BACKGROUND

Various types of computer applications need to define a model of some piece of communications equipment. The device models have a template or metadata which describes them. When a new device needs to be defined, the definition is typically created from these templates or metadata so that it is built properly according the specific type of the device.

Typically these templates or metadata are defined ahead of time in the application. Currently, this is a manual process, where the documentation about the specific type of device is consulted and the template or metadata built using that information. This can be a time consuming process and since this needs to be done before the devices can be created in the application, this can slow down the entire process of defining new devices and new components to devices.

There is thus a need for addressing these and/or other issues associated with the prior art.

SUMMARY

A system, method, and computer program product are provided for automatically generating communication device metadata definitions. In use, device information is received from at least one instance of at least one communication device associated with a communication network. Additionally, a device metadata definition associated with the at least one communication device is automatically generated utilizing the device information, the device metadata definition representing at least attributes of the at least one communication device.

DETAILED DESCRIPTION

Figure 1:
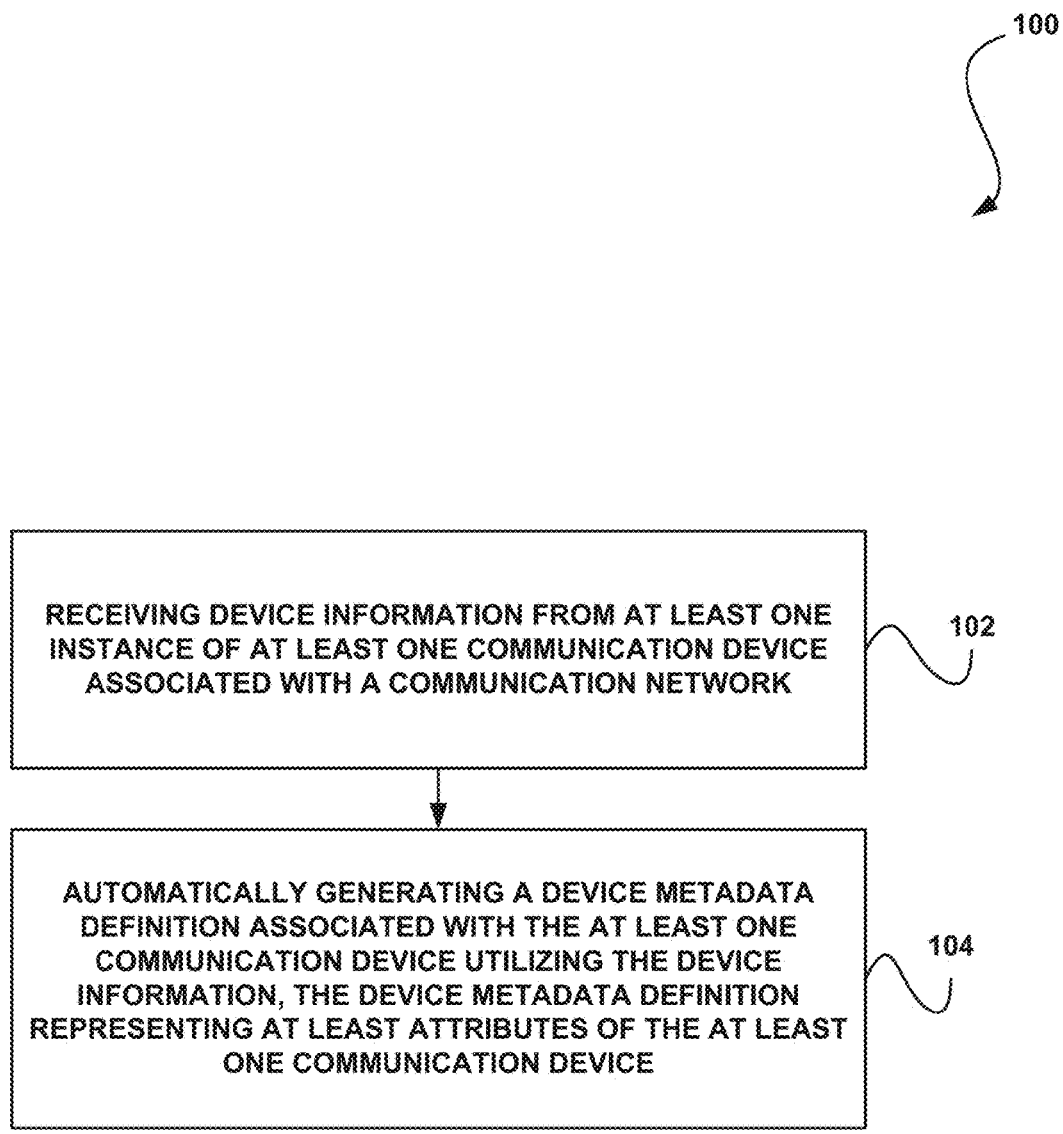
FIG. 1 illustrates a method for automatically generating communication device metadata definitions, in accordance with one embodiment.

FIG. 1 illustrates a method 100 for automatically generating communication device metadata definitions, in accordance with one embodiment.

As shown, device information is received from at least one instance of at least one communication device associated with a communication network. See operation 102. The device information may include any information associated with the device, a portion of the device (e.g. hardware, software, etc.), and/or a communication network associated therewith.

Furthermore, the communication device may include any device capable of sending and/or receiving communications. As an example, the communication device may include a network switch. As another example, the communication device may include a network router. As another example, the communication device may include a firewall. As another example, the communication device may include a mobile phone. As yet another example, the communication device may include a computing device (e.g. a tablet computer, a handheld computer, etc.).

Additionally, a device metadata definition associated with the at least one communication device is automatically generated utilizing the device information, the device metadata definition representing at least attributes of the at least one communication device. See operation 104.

The device metadata definition may include any information associated with the device. In one embodiment, the device metadata definition may represent a model of the device that is an abstraction of the device and may represent the attributes, structure, and capabilities of the device. The attributes may include any attributes associated with the device, such as a model number, a part number, characteristics, descriptions, and/or various other information.

The device metadata definition may be generated utilizing a variety of techniques. For example, in on embodiment, the device metadata definition may be automatically generated utilizing a pre-defined algorithm. In another embodiment, the device metadata definition may be automatically generated utilizing a rules engine.

In another embodiment, the device metadata definition may be automatically generated utilizing an adaptive algorithm (e.g. a learning algorithm, a manually configurable algorithm, etc.). In this case, the adaptive algorithm may be customizable by a user to follow patterns associated with customer requirements. Further, in one embodiment, the adaptive algorithm may be operable to model practices associated with a customer to provide the device metadata definition. Still yet, the adaptive algorithm may be operable to improve the accuracy of device metadata definitions over time by recognizing common patterns of completion of proposed metadata definitions.

In either case, the device metadata definition associated with the at least one communication device may be automatically generated utilizing the device information without a user providing information (e.g. at least initially) for the device metadata definition.

Additionally, in one embodiment, the method 100 may include determining whether there is incomplete device information to generate a complete device metadata definition. In this case, if it is determined that there is incomplete device information to generate the complete device metadata definition, missing device information required to generate the complete device metadata definition may be identified. In one embodiment, information to use for the missing device information required to generate the complete device metadata definition may be automatically proposed (e.g. utilizing a user interface, etc.). Further, additional information to complete the device metadata definition may be received (e.g. from a user, etc.).

Implementation of the method 100 functions to simplify and reduce the work of defining the templates or metadata for device models by learning the details of the devices from the actual devices themselves, instead of having the details defined manually by a programmer or operator. This provides business benefits including lower costs and faster service times for communication services.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Various types of computer applications need to define a model of some piece of communications equipment, from hand-held devices to switching and routing equipment in the core of the communications network. This model is an abstraction of the device and represents the key attributes, structure and capabilities of the device. Examples of the computer applications are Network Inventory Systems and Handset Tracking Systems, etc.

The device models have a template or metadata which describes what they look like. When a new device needs to be defined, it is created from these templates or metadata so that it is built properly according the specific type of the device. For example, that the device has three communication circuit boards in it, or it has three radio antennas.

Typically these templates or metadata are defined ahead of time in the application. This is typically a manual process where the documentation about the specific type of device is consulted and the template or metadata built using that information. This can be a time consuming process and since this needs to be done before the devices can be created in the application, this can slow down the whole process of defining new devices and new components to devices. For example, one needs to define just how many circuit boards a Cisco 7609 router can contain and how they are oriented in the device before one can create a Cisco 7609 device in an inventory application.

These device models are somewhat costly to define and maintain. The work requires expertise about the specific communications equipment, communications network technologies, wiring/cabling practices for communications equipment and of course the modeling capabilities of the application. Some of this information is publicly available, and some of it is only available privately from the equipment manufacturers. The information that is available is of varying completeness and is often not 100% reliable or complete. The information can quickly become out-of-date, more so for the equipment that is closer to the user, particularly for consumer purchased equipment.

In particular, the maintenance of these models is difficult to manage smoothly. In practice, most applications are the last to know about new devices being used in a communications network, leading to delays and stressed schedules to get the modeling completed so that the new devices can be modeled. For example, new communication circuit boards in network equipment very often simply appear in the communications network with no warning and so the model definition has to be done very quickly in response to discovery in the network.

Figure 2:
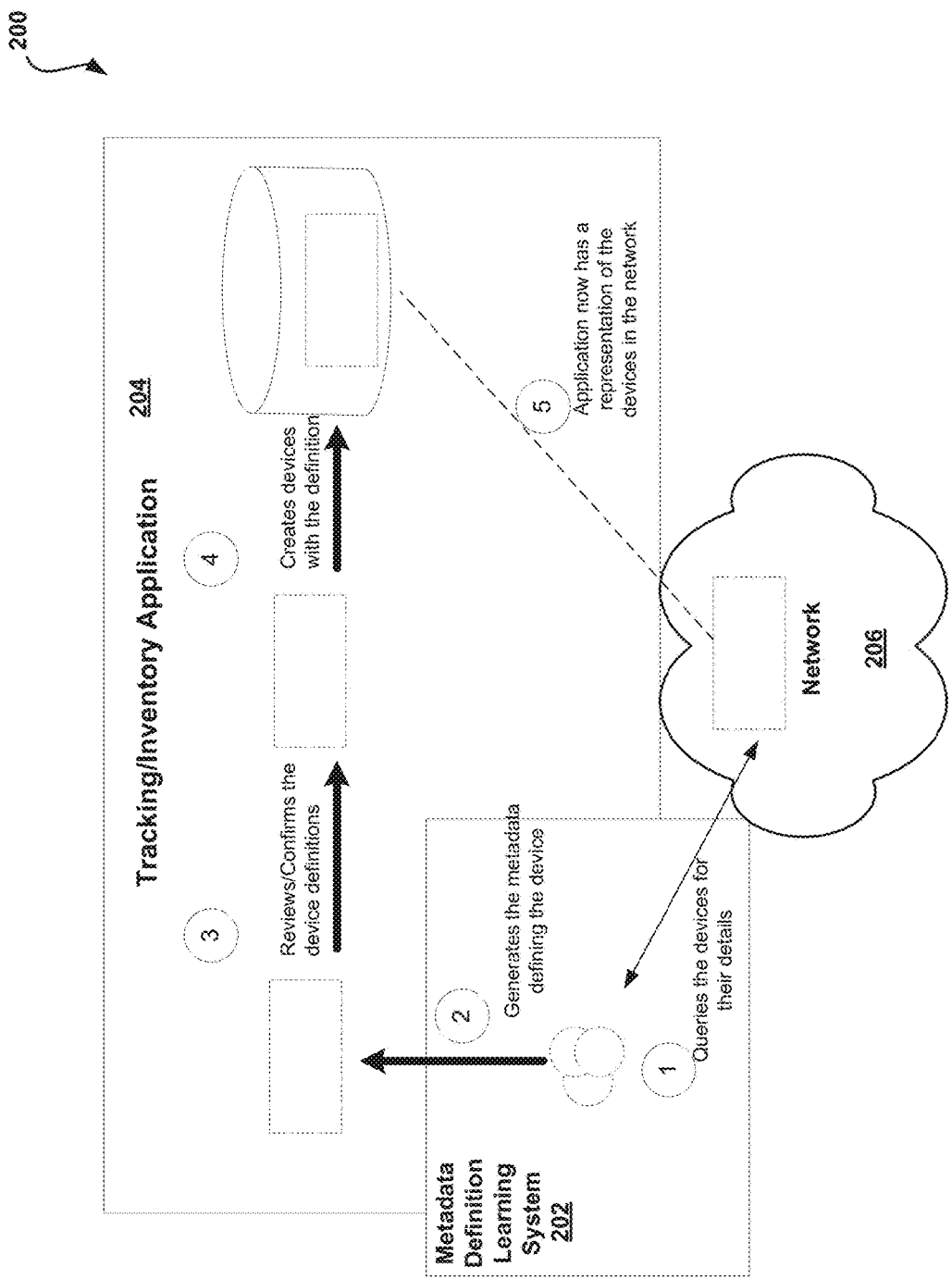
FIG. 2 illustrates a system flow for automatically generating communication device metadata definitions, in accordance with one embodiment.

FIG. 2 illustrates a system flow 200 for automatically generating communication device metadata definitions, in accordance with one embodiment. As an option, the system flow 200 may be implemented in the context of the details of FIG. 1. Of course, however, system flow 200 may be implemented in the context of any desired environment. Further, the aforementioned definitions may equally apply to the description below.

As shown, the system 200 includes a metadata definition learning system 202 and a tracking/inventory application 204. In operation, the metadata definition learning system 202 may query devices for details (e.g. over a communication network 206, etc.) and automatically generate the metadata defining the device.

In one embodiment, an operator may use the tracking/inventory application 204 to review and/or confirm the automatically generated device definition and create devices with the definition.

Using information from the communications network, an application may automatically build device metadata. The application may learn the device metadata from instances of the devices. Key information for this definition (e.g. such as part numbers, etc.) may be available, such that the network information may be tied to a business or product context that the operators understand. In various embodiments, the device metadata may be derived through pre-defined algorithms such as a rules engine or expert systems that determine how to translate examples of these devices into a correct device metadata definition.

In some cases, the information from the network may be insufficient to complete a metadata definition. However, the essential information may be present to provide key attributes. This may vary across the different types of devices and components. Where there is incomplete information to complete the metadata definition, the system 200 may function to assist in completing the device model, identifying missing information, and proposing intelligent completions for an operator to review and possibly enhance and/or complete, before accepting a complete metadata definition of a device.

In some cases, the additional information provided by the operator may make the metadata definition more complete and allow the devices created from this definition to fully participate in all of the features of the application. For example, if the power consumption of a component cannot be learned from the devices in the network, the operator could supply this additional piece of information so that power consumption analysis would be available for these types of devices.

In one embodiment, the learning algorithms used by the application may be customizable by the operator to follow patterns specific to the customer's requirements. Device modeling is often flexible in the application in order to suit different business needs and so modeling practices particular to that customer may be inputted to the application to provide better proposed models. For example, power management may be a priority for a customer and so this may be certain to be defined and learned from the network. For another customer, power management may not be of a concern and may not need to be modeled and learned.

The application may improve the accuracy of its definitions over time, by recognizing common patterns of correction/completion of the proposed metadata definitions to the final definition. An existing database of network information and matching device metadata definitions may provide input to train such a learning system.

Some benefits of such learned device metadata definitions include cost reduction, improvements in accuracy, and reduction in timelines.

Cost is reduced by having information collected and presented to an operator for their further work. This assistance greatly improves the efficiency of the operator for such tasks. Matching up the information from the network, in its different formats and management protocols, with the product literature of the equipment providers can be time-consuming and costly. Automating this basic information gathering is a benefit.

Accuracy is improved as the network is used as input, instead of an operator gathering information from offline sources and then trying it out on the real equipment. Product technical information is not always up-to-date and so using live data ensures accuracy.

Also, timelines are reduced by having the equipment modeling process started as soon as it is detected in the network, rather than having some exception generated for an operator that then has to be investigated and a modeling process started and managed manually.

Figure 3:
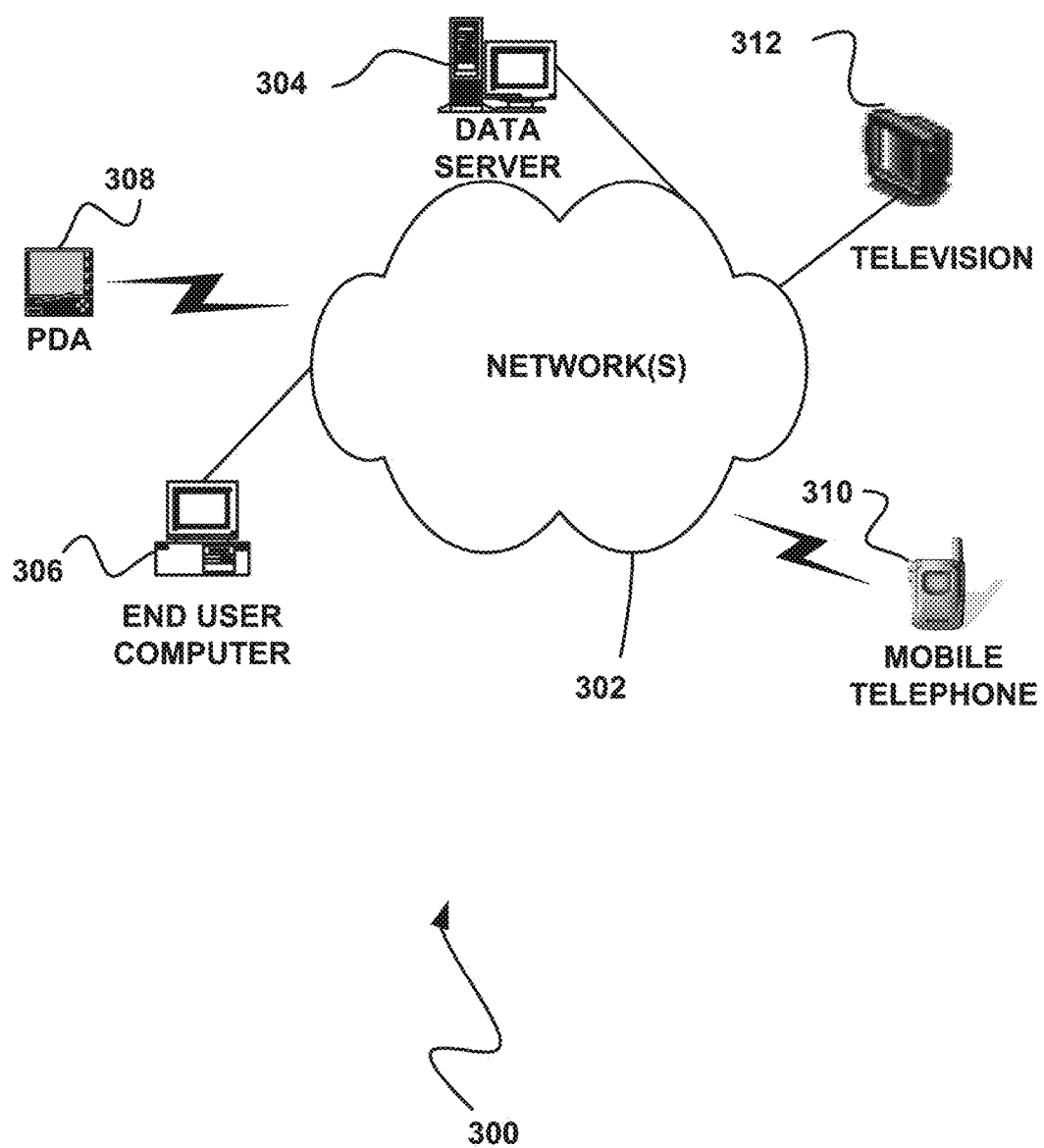
FIG. 3 illustrates a network architecture, in accordance with one possible embodiment.

FIG. 3 illustrates a network architecture 300, in accordance with one possible embodiment. As shown, at least one network 302 is provided. In the context of the present network architecture 300, the network 302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 302 may be provided.

Coupled to the network 302 is a plurality of devices. For example, a server computer 304 and an end user computer 306 may be coupled to the network 302 for communication purposes. Such end user computer 306 may include a desktop computer, lap-top computer, and/or any other type of logic. Still yet, various other devices may be coupled to the network 302 including a personal digital assistant (PDA) device 308, a mobile phone device 310, a television 312, etc.

Figure 4:
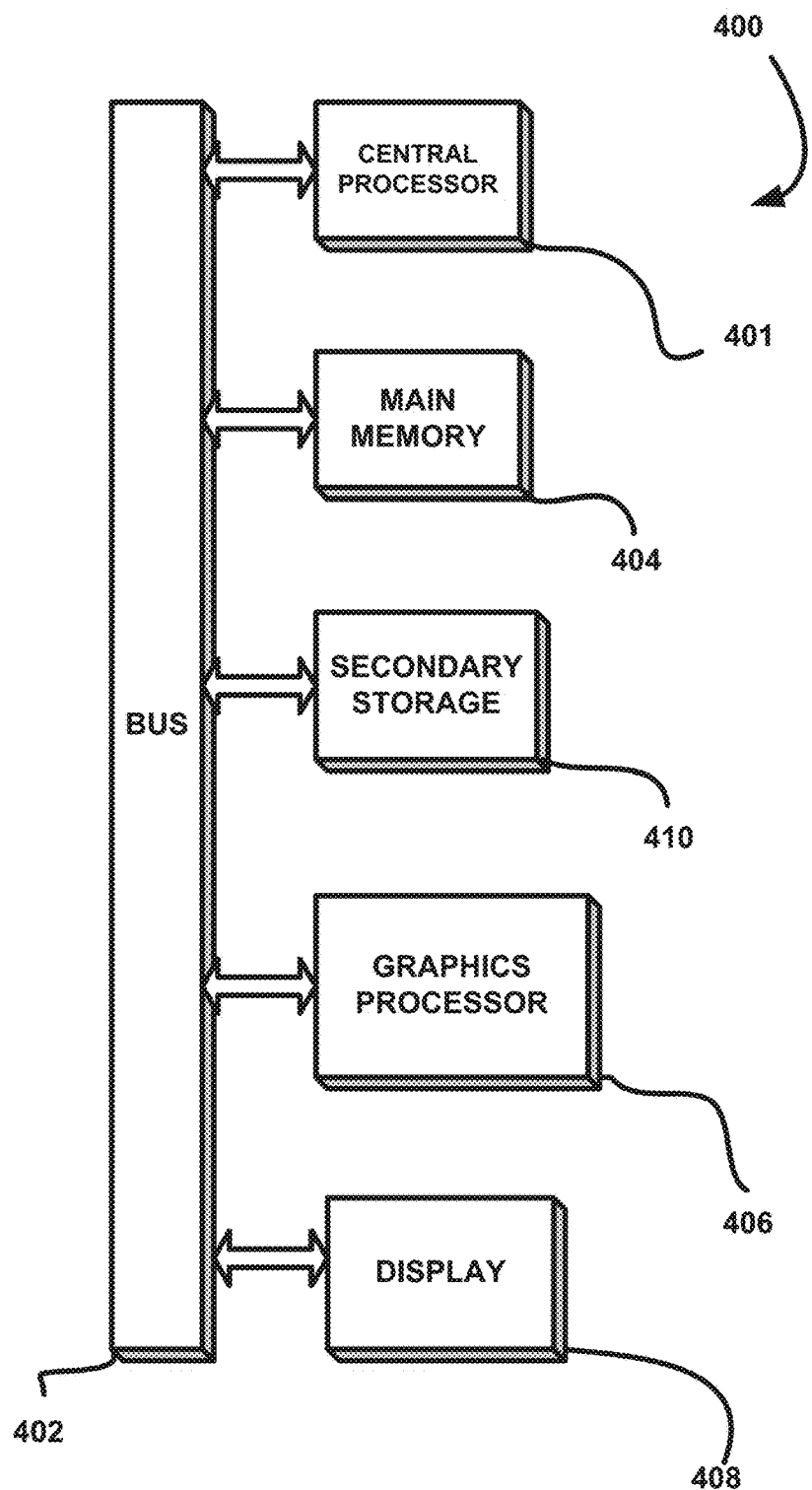
FIG. 4 illustrates an exemplary system, in accordance with one embodiment.

FIG. 4 illustrates an exemplary system 400, in accordance with one embodiment. As an option, the system 400 may be implemented in the context of any of the devices of the network architecture 300 of FIG. 3. Of course, the system 400 may be implemented in any desired environment.

As shown, a system 400 is provided including at least one central processor 401 which is connected to a communication bus 402. The system 400 also includes main memory 404 [e.g. random access memory (RAM), etc.]. The system 400 also includes a graphics processor 406 and a display 408.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404, the secondary storage 410, and/or any other memory, for that matter. Such computer programs, when executed, enable the system 400 to perform various functions (as set forth above, for example). Memory 404, storage 410 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving, by a system, device information from a hardware device connected to a communication network and adapted for transmitting communications in the communication network;
   automatically generating, by the system, a device metadata definition for the hardware device utilizing the device information and an adaptive algorithm, the device metadata definition representing a model of the hardware device and storing at least attributes of the hardware device including:
      a model number of the hardware device,
      a structure of the hardware device, and
      capabilities of the hardware device;
   receiving, by the system from a user, a change manually made to the device metadata definition that includes at least one of a correction and a completion manually made to the device metadata definition to form a final device metadata definition for the hardware device;
   storing, by the system, the final device metadata definition for the hardware device;
   over time, recognizing, by the adaptive algorithm of the system, a common pattern of the change being made manually to additional device metadata definitions generated by the system for additional instances of the hardware device connected to the communication network;
   training the adaptive algorithm in accordance with the recognized common pattern to improve subsequent accuracy of modeling of further instances of the hardware device connected to the communication network by the system; and
   modeling, by the system, each of the further instances of the hardware device using the trained adaptive algorithm by:
      receiving, by the system, additional device information from the further instance of the hardware device, and
      automatically generating, by the system, a new final device metadata definition for the further instance of the hardware device utilizing the additional device information and the trained adaptive algorithm, such that the new final device metadata definition automatically includes the change.

2. The method of claim 1, further comprising determining that the device information is incomplete for generating the final device metadata definition for the hardware device.

3. The method of claim 2, further comprising identifying missing device information required to generate the final device metadata definition.

4. The method of claim 3, further comprising proposing information to use for the missing device information required to generate the final device metadata definition.

5. The method of claim 4, wherein the change is received from the user to complete the device metadata definition.

6. The method of claim 1, wherein automatically generating the device metadata definition for the hardware device utilizing the device information occurs without the user initially providing information for the device metadata definition.

7. A computer program product embodied on a non-transitory computer readable medium, comprising:
   computer code for receiving, by a system, device information from a hardware device connected to a communication network and adapted for transmitting communications in the communication network;

computer code for automatically generating, by the system, a device metadata definition for the hardware device utilizing the device information and an adaptive algorithm, the device metadata definition representing a model of the hardware device and storing at least attributes of the hardware device including:
a model number of the hardware device,
a structure of the hardware device, and
capabilities of the hardware device;
computer code for receiving, by the system from a user, a change manually made to the device metadata definition that includes at least one of a correction and a completion manually made to the device metadata definition to form a final device metadata definition for the hardware device;
computer code for storing, by the system, the final device metadata definition for the hardware device;
computer code for, over time, recognizing, by the adaptive algorithm of the system, a common pattern of the change being made manually to additional device metadata definitions generated by the system for additional instances of the hardware device connected to the communication network;
computer code for training the adaptive algorithm in accordance with the recognized common pattern to improve subsequent accuracy of modeling of further instances of the hardware device connected to the communication network by the system; and
computer code for modeling, by the system, each of the further instances of the hardware device using the trained adaptive algorithm by:
receiving, by the system, additional device information from the further instance of the hardware device, and
automatically generating, by the system, a new final device metadata definition for the further instance of the hardware device utilizing the additional device information and the trained adaptive algorithm, such that the new final device metadata definition automatically includes the change.

8. A system comprising:
a memory system; and
one or more processing cores coupled to the memory system and that are each configured to:
receive device information from a hardware device connected to a communication network and adapted for transmitting communications in the communication network;
automatically generate a device metadata definition for the hardware device utilizing the device information and an adaptive algorithm, the device metadata definition representing a model of the hardware device and storing at least attributes of the hardware device including:
a model number of the hardware device,
a structure of the hardware device, and
capabilities of the hardware device;
receive, from a user, a change manually made to the device metadata definition that includes at least one of a correction and a completion manually made to the device metadata definition to form a final device metadata definition for the hardware device;
store the final device metadata definition for the hardware device;
over time, recognize, by the adaptive algorithm, a common pattern of the change being made manually to additional device metadata definitions generated for additional instances of the hardware device connected to the communication network;
train the adaptive algorithm in accordance with the recognized common pattern to improve subsequent accuracy of modeling of further instances of the hardware device connected to the communication network; and
model each of the further instances of the hardware device using the trained adaptive algorithm by:
receiving additional device information from the further instance of the hardware device, and
automatically generating a new final device metadata definition for the further instance of the hardware device utilizing the additional device information and the trained adaptive algorithm, such that the new final device metadata definition automatically includes the change.

9. The method of claim 1, further comprising:
discovering the hardware device in the communication network;
wherein automatically generating the device metadata definition occurs in response to discovering the hardware device in the communication network.

10. The method of claim 1, wherein the change manually made to the device metadata definition by the user includes the completion manually made to the device metadata definition, the completion being a power consumption of the hardware device supplied by the user which cannot be learned from the received device information.

11. The method of claim 1, wherein the learning algorithm is customized differently for different customers to follow patterns specific to requirements of the different customers, such that different models are provided to different customers based on the requirements of the different customers.

* * * * *